United States Patent
Zhou (10) Patent No.: US 11,537,622 B2
(45) Date of Patent: Dec. 27, 2022

(54) K-NEAREST NEIGHBOUR SPATIAL QUERIES ON A SPATIAL DATABASE

(71) Applicant: Ordnance Survey Limited, Southampton (GB)

(72) Inventor: Sheng Zhou, Southampton (GB)

(73) Assignee: Ordnance Survey Limited, Southampton (GB)

( * ) Notice: Subject to any disclaimer, the term of this patent is extended or adjusted under 35 U.S.C. 154(b) by 242 days.

(21) Appl. No.: 16/914,926

(22) Filed: Jun. 29, 2020

(65) Prior Publication Data
US 2021/0004378 A1 Jan. 7, 2021

(30) Foreign Application Priority Data
Jul. 1, 2019 (EP) .................................... 19183722

(51) Int. Cl.
*G06F 16/00* (2019.01)
*G06F 16/2457* (2019.01)
*G06F 16/29* (2019.01)

(52) U.S. Cl.
CPC ........ *G06F 16/24575* (2019.01); *G06F 16/29* (2019.01)

(58) Field of Classification Search
CPC ........................... G06F 16/29; G06F 16/24575
See application file for complete search history.

(56) References Cited

U.S. PATENT DOCUMENTS

| | | | | |
|---|---|---|---|---|
| 8,099,380 | B1* | 1/2012 | Shahabi | H04W 4/023 706/62 |
| 10,200,814 | B1* | 2/2019 | Zhang | G06K 9/6276 |
| 2009/0210413 | A1* | 8/2009 | Hayashi | G06F 16/2465 707/999.005 |
| 2012/0226889 | A1* | 9/2012 | Merriman | G06F 16/2255 711/216 |

OTHER PUBLICATIONS

Wu, Jie, "Research of Spatial Data Query Optimization Methods Based on K-Nearest Neigbor Algorithm," Journal of Information and Computational Science, vol. 12, No. 17, Nov. 20, 2015, pp. 6289-6298.
EP Extended Search Report—EP Application No. 19183722.8 dated Sep. 17, 2019.

* cited by examiner

*Primary Examiner* — Dinku W Gebresenbet
(74) *Attorney, Agent, or Firm* — Banner & Witcoff, Ltd.

(57) ABSTRACT

K-NN spatial queries may be performed, and the results of one K-NN query are re-used to perform a plurality of K-NN queries on a set of query points. More specifically, a K-NN query is performed on a pre-defined location, for example, an object point, to find the nearest K data objects for this pre-defined location, the results of this K-NN query being used to perform further K-NN queries on the query points near the pre-defined location. In doing so, the efficiency of large scale K-NN spatial queries is improved by limiting the spatial search range of the K-NN queries to be performed and re-using pre-computed K-NN data.

20 Claims, 10 Drawing Sheets
(8 of 10 Drawing Sheet(s) Filed in Color)

K-NEAREST NEIGHBOUR SPATIAL QUERIES ON A SPATIAL DATABASE

CROSS-REFERENCE TO RELATED APPLICATIONS

This application claims priority to European Patent Application No. 19183722.8 filed 1 Jul. 2019, entitled "A Method of Performing K-Nearest Neighbour Spatial Queries on a Spatial Database."

FIELD

Aspects described herein relate to a computer implemented method and system for performing K-nearest neighbour (K-NN) spatial queries on a spatial database. In particular, aspects relate to methods and systems for performing large scale spatial queries in which a set of pre-computed K-NN query results are used to perform K-NN queries on a further set of data points.

BACKGROUND

Spatial databases are used as a means for storing and querying data representative of objects defined in geographic space, and are used to store and analyse information about different geographic areas.

A K-nearest neighbours (K-NN) query is one of the most frequently performed spatial queries in a spatial database. For example, a single K-NN query may be to find the 6 nearest primary schools to an address "X".

General speaking, a single K-NN query may be easily solved and most spatial database servers are optimised to handle K-NN queries efficiently via the utilisation of appropriate spatial indices, for example, an R-Tree data structure.

However, there are still certain situations that are problematic for a basic K-NN query, specifically, scenarios that require a very large number of queries to be made, and improvements thereto are required. One example of such a scenario include situations in which the number of points to be queried is significantly larger than the objects of the query. For example, the objective of the K-NN query may be to identify the 6 nearest schools to every individual residential address in the UK, wherein the number of schools (about 24,000) is relatively small compared to the number of residential addresses in the UK (almost 29 million). Another example may be scenarios in which the query points are changing in real-time. For example, the objective of the spatial query may be to provide real-time updates of the 5 nearest restaurants to a user moving around a town or city.

In current methods, each K-NN query is performed one by one, which can take a considerable amount of time where a large number of queries is required to find the answer to the query. Therefore, an improved method of doing batch K-NN queries is required.

SUMMARY

Aspects described herein address the above noted problems by providing a computer-implemented method and system for performing K-NN spatial queries in which the results of one K-NN query are pre-computed and re-used to perform a plurality of K-NN queries on a set of query points. More specifically, a K-NN query is performed on a pre-defined location, for example, an object point, to find the nearest K data objects for this pre-defined location, the results of this K-NN query being used to perform further K-NN queries on the query points near the pre-defined location. In doing so, the efficiency of large scale K-NN spatial queries is improved by limiting the spatial search range of the K-NN queries to be performed and re-using pre-computed K-NN data.

A first aspect provides a computer implemented method of performing K-nearest neighbour (K-NN) spatial queries on a spatial database, wherein K is an integer value, the method comprising receiving instructions to perform a K-NN query on the spatial database to find a set of K-NN data objects for a plurality of query locations, processing a plurality of pre-defined locations to calculate a plurality of object distances, wherein an object distance corresponds to a maximum distance between a pre-defined location and its K nearest neighbouring data objects, identifying a first pre-defined location and determining a candidate set of query locations therefrom, computing a range of the K-NN query for the candidate set of query locations in dependence on the object distance calculated for the first pre-defined location, and a maximum distance between the first pre-defined location and one of the query locations within the candidate set, and determining a set of K-NN data objects for each of the candidate set of query locations in dependence on the computed range.

As such, using the spatial relationship between the objects of the K-NN query and a pre-defined location, the range of the K-NN query for a group of query locations within close proximity, specifically, those having the same nearest data object, can be defined such that the K-NN objects for each query location is within the given range. In practice, the pre-defined location will typically correspond to one of the data objects to be processed. Consequently, the set of retrieved data objects from a single spatial query contains the K-NN results for all the query locations in the candidate set whilst all other data objects within the spatial database can be disregarded, and for each query location, only the data objects within the range computed in dependence on the calculated object distance need to be analysed to find the K-NN data objects for this query location, thereby increasing the speed and efficiency with which the repeated K-NN queries can be performed. In this respect, K-NN queries of multiple groups of query locations can be run in parallel, with each query being limited to the calculated range for that group, to further improve efficiency. This is particularly beneficial for queries involving very large numbers of query locations and/or query locations that are changing position in real-time.

Computing the range of the K-NN query may comprise calculating an area of the spatial database, the area containing at least one data object. That is to say, the range of the K-NN query is defined by a spatial area of interest containing at least one data object.

For example, computing the range of the K-NN query may comprise calculating an area of the spatial database enclosed by a circle having a maximum radius calculated using the object distance calculated for the first pre-defined location and a maximum distance between the first pre-defined location and one of the query locations within the candidate set.

In this respect, the maximum radius, $R_{MAX}$, may be calculated by:

$$R_{MAX} = R_P + 2D_{PQMAX}$$

Here, $R_P$ is the object distance calculated for the first pre-defined location, and $D_{PQMAX}$ is the maximum distance between the first pre-defined location and one of the query locations within the candidate set.

It will however be appreciated that the area calculated may have a different configuration, for example, an axis-aligned square that is centered at P with side length of $2*(R_P+2D_{PQMAX})$ may also be used, or likewise, a polygon constructed by buffering the Voronoi cell for P outwards by a buffer distance of $R_P+D_{PQMAX}$.

The determining a set of K-NN data objects may comprise identifying a set of data objects contained within the calculated area, and computing the K-NN data objects for each query location within the candidate set from the set of data objects within the calculated area. The computing the K-NN data objects for each query location may comprise calculating a distance from each query location to each data object within the calculated area. For example, a set of 10 data objects may be contained within the calculated area for a K-NN query where K=7. For each query location within the calculated area, the 10 data objects will be searched to find the 7 nearest neighbouring data objects, for example, by calculating the distance to each of the 10 data objects.

The processing a plurality of pre-defined locations may further comprise generating a polygon partitioning of the spatial database, wherein a plurality of polygons are generated such that each polygon represents an area comprising a single pre-defined location. For example. Thiessen polygons/Voronoi diagrams comprising a set of pre-defined locations may be used for this purpose to ensure the corresponding pre-defined location is the closest pre-defined location for any query location within the polygon.

In some cases, the determining a candidate set of query locations may comprise identifying query locations contained within a polygon corresponding to the first pre-defined location. As such, the first pre-defined location is the closest pre-defined location for all of the query locations within its polygon, and hence the calculated maximum search range is applicable to all of these query locations. Such processing may be used in cases where the position of the query locations is known prior to the K-NN query.

In some cases, the determining a candidate set of query locations may comprise identifying one or more dynamic query locations and tracking a position of the one or more dynamic query locations in real time. For example, the query location(s) may be representative of a user on the move, wherein the K-NN data objects is changing with time. The K-NN data objects may be buildings having fixed locations and so the user will be closest to different buildings at different points along their trajectory.

In such cases where the position of the query locations is unknown prior to the K-NN query, the maximum distance between the first pre-defined location and one of the dynamic query locations may be a predetermined distance based on the processing of the plurality of pre-defined locations. As such, in order to calculate the maximum search range of the K-NN query, a pre-determined estimate of the maximum distance from the first pre-defined location to one of the dynamic query locations is calculated from the processing of the plurality of pre-defined locations. For example, the processing a plurality of pre-defined locations may further comprise generating a polygon partitioning of the spatial database, wherein a plurality of polygons are generated such that each polygon represents an area comprising a single pre-defined location. The predetermined distance may therefore be a maximum distance between the first pre-defined location and a vertex of its respective polygon. In this respect, the furthest vertex corresponds to the furthest distance from the first pre-defined location that a query location can be without being closer to a different data object within the spatial database.

In cases where the candidate set of query locations are dynamic query locations, determining the K-NN data objects of each dynamic query location may comprise dynamically updating the K-NN data objects of each dynamic query location based on its current position within the spatial database at a given time. That is to say, the K-NN data objects can be continuously updated as the query locations travel along their trajectory.

The method may further comprise generating a visual output of the set of K-NN data objects of at least one of the candidate set of query locations for display. The visual output may be in any suitable format, for example, a graphical representation, a table, a map or any way of visually representing the results of the K-NN query.

The spatial database may comprise geospatial data representative of a geographic area. In this respect, the data objects and query locations may be representative of anything capable of being represented and stored as geospatial data, for example, buildings, roads, water features, vegetation, geographic boundaries, landmarks, railways, network lines and the like. As described above, the query locations may also be the geographical coordinates of a moving object such as a vehicle or a person.

A further aspect provides a system comprising a processor, and a computer readable medium storing one or more instruction(s) arranged such that when executed the processor is caused to perform the method described above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Further features and advantages will become apparent from the following description of embodiments thereof, presented by way of example only, and by reference to the drawings, wherein.

DETAILED DESCRIPTION

As described previously, K-nearest neighbour (K-NN) queries are a common type of spatial query performed on a spatial dataset, but are particularly inefficient at performing spatial queries in particular cases, specifically, cases in which a very large number of queries are required.

One of the characteristics of K-NN queries is that the range of the spatial search to be performed is unknown prior to the search, and depends on the location of the query point and the distribution of data points in the spatial database. On the one hand, the search process must find at least k data points, but on the other hand, the search process also needs to ensure no other data points can be closer to the query point than the found k points. However, for two data points in close proximity, their K-NN sets are often identical or share many of the same members. In one or more aspects, the search results of one object point are re-used for a set of nearby query points to improve the speed at which the data may be processed.

For simplicity and clarity, the methods described herein refer to point-in-point queries, that is, the data objects and query locations are both points. However, it will be appreciated that the techniques presented herein may be extended to support linear and areal objects and queries.

Figure 1A:
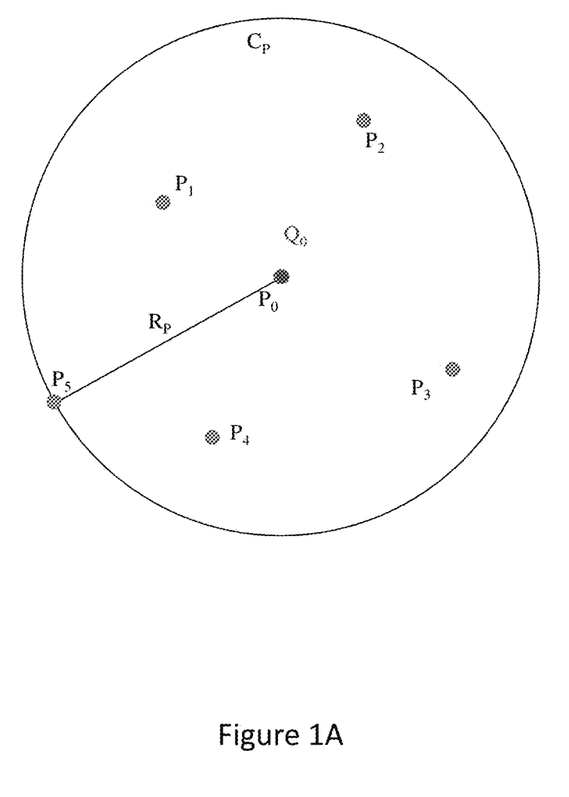
FIGS. 1A-C are diagrams illustrating various aspects described herein.
Figure 1B:
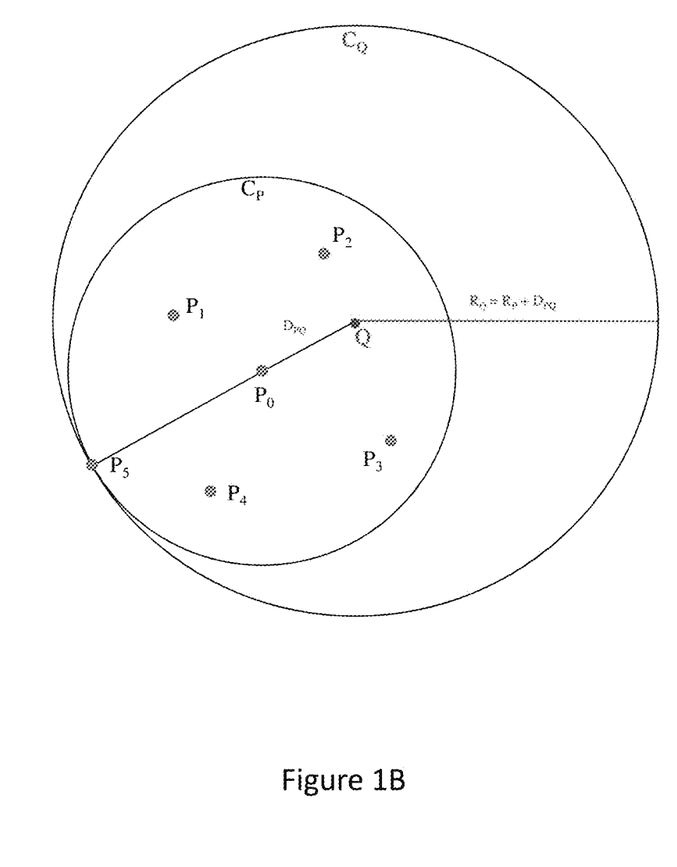
Figure 1C:
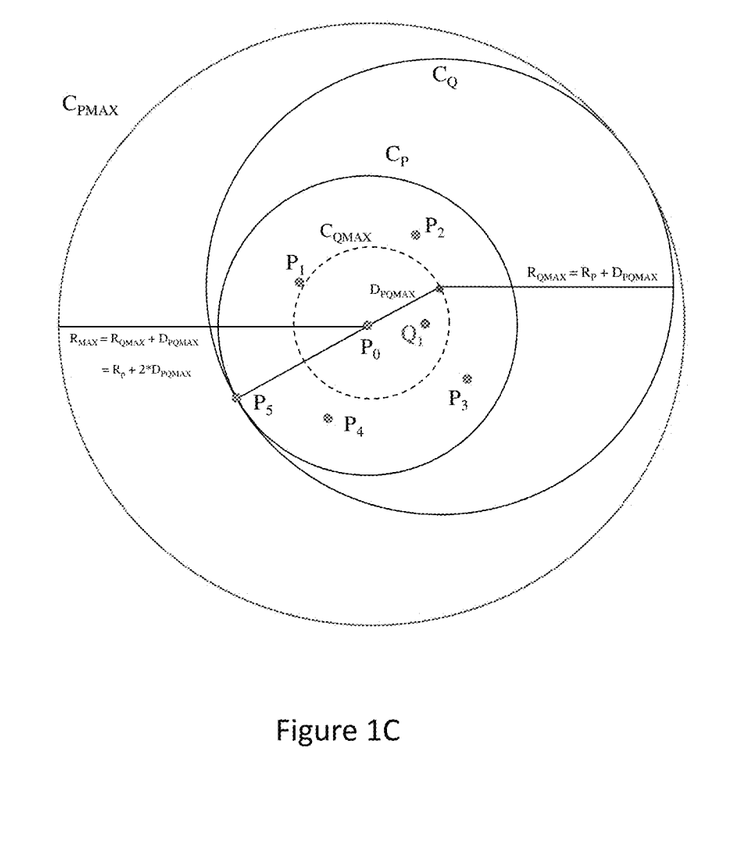

FIGS. 1A-C illustrate how the results of one K-NN query can be used to search other query point, using the above example in which the objective of the query is to identify the 6 nearest schools to every individual residential address in the UK. FIG. 1A shows a point object $P_0$ and its 5 nearest neighbours $P_1$-$P_5$ in the object set, where each object $P_i$ represents a school in the object set. The distance from the point object $P_0$ to the furthest object of its K-NN is denoted as $R_P$=Distance ($P_0$, $P_5$). Let's now consider a query point $Q_0$ at the same location as $P_0$, where $Q_0$ in this example is a residential address. Given K=6, the K nearest neighbours of query point $Q_0$ in the object set, that is, the 6 nearest schools, is $S_0$={$P_0$, $P_1$, $P_2$, $P_3$, $P_4$, $P_5$}, having a known K-NN range of $R_P$ which is the distance from $Q_0$ to $P_5$, the furthest point in $S_0$. That is to say, the K-NN of query point $Q_0$ is known to be within the circle CP with a radius $R_P$ and centered at $P_0$.

As illustrated by FIG. 1B, a new query point Q is then provided, for example, another residential address, which is a distance $D_{PQ}$=Distance (Q, $P_0$) away from point $P_0$. A circle $C_Q$ having a radius $R_Q$=$R_P$+$D_{PQ}$ centered at Q can be drawn, representing the smallest possible circle centered at query point Q which also contains the circle CP, meaning that the object set $S_0$={$P_0$, $P_1$, $P_2$, $P_3$, $P_4$, $P_5$} is also contained within the circle $C_Q$. As such, the K-NN of query point Q, that is, the 6 nearest schools to address Q, will also be within the circle $C_Q$. As the circle $C_Q$ contains at least the six nearest schools for $Q_0$, it is possible that the circle $C_Q$ will comprise more than six schools. As such, a subsequent spatial query of Distance (x, Q)≤$R_Q$ to find the K-NN of point Q will retrieve at least the K-NN of Q. If there are no other objects inside $C_Q$, then the K-NN for query point $Q_0$ is the same as the K-NN for query point Q, that is, Q and $Q_0$ are nearest to the same six schools. If there are more than K objects retrieved, a distance comparison will be required to find the nearest K objects for Q. That is to say, the K-NN of Q can be found by comparing the distances to the objects in $S_0$ to the distances to any other objects not in $S_0$ but contained within $C_Q$.

The above observation can then be extended to a set of new query points $Q_i$, that is, a set of residential addresses, as illustrated by FIG. 1C. FIG. 1C shows one query point $Q_1$ within that query set Q. The distance between $Q_1$ and the object point $P_0$ is up to $D_{PQMAX}$, where $D_{PQMAX}$ is the maximum distance between $P_0$ and one of the query points in the set $Q_i$. As such, the query point $Q_i$, along with all of the other query points within the set Q, is within the circle $C_{QMAX}$ having a radius $D_{PQMAX}$ centered at $P_0$. The K-NN of $Q_i$, and again any point in the query set $Q_i$, is within the circle $C_{PMAX}$ centered at $P_0$ with a radius $R_{MAX}$=$R_{QMAX}$+$D_{PQMAX}$=$R_P$+2$D_{PQMAX}$. As such, the circle $C_{PMAX}$ will contain all of the six nearest schools for each of the addresses in the set $Q_i$. Therefore, the database can be queried using the circle $C_{PMAX}$ to retrieve a set of objects S, which will be equal to or at least containing $S_0$, $S_0$⊆S. As such, the range of the K-NN queries for each query point in $Q_i$ can be confined to the area within the circle $C_{PMAX}$, and so a K-NN query for any point in $Q_i$ can be found directly from the set of objects S, using a distance comparison if required, without needing to make any further queries to the database.

As such, the above processing enables the whole spatial dataset to be queried performed more efficiently by using the search results of one query point to search other nearby query points.

Overview of Method for Performing K-NN Spatial Queries

A method of performing spatial queries based on the above will now be described with reference to FIG. 2, wherein the K-NN (K≥1) is computed in an object point set S for a query point set Q.

In the first step 2.2, data is received from a spatial database 200 in order to pre-process the object point set S, which provides the locations to be used as a set of pre-defined locations L, in order to find the radius $R_P$, upon which the above method is based. It should be noted that the present examples uses the locations of object points as pre-defined locations for convenience and simplicity, but it will be appreciated that other pre-defined locations that do not correspond to data objects may also be used, for example, the pre-defined locations may uniformly or randomly generated. In this respect, the distance between one pre-defined location, in this example at the base object point $P_0$, to its $K^{th}$ nearest neighbour in S provides the base radius $R_P$. Any suitable method of pre-processing the object point set may be implemented, as will be described in more detail below.

For each pre-defined location I∈L, its K nearest neighbouring object points can be found, and the distances to its $i^{th}$ nearest (i=1, K) neighbour objects can be calculated and stored as $D_n$ (n=2, K). By storing multiple $D_n$, it is possible to support k-NN queries of various k≤K on the object set S. In cases where the pre-defined locations correspond to data objects, $D_1$ is not stored since the distance to the nearest neighbouring data object is zero. In cases where other pre-defined locations are used, D1 may not be zero and will therefore be stored for later use. From this pre-processing, the query location candidate set $Q_P$ can then be identified for each pre-defined location, which in this case are corresponding to an object point P∈S (step 2.4), that is, for each pre-defined location. The methods by which candidate set $Q_P$ is determined will depend on the nature of the spatial query, as will be explained in more detail below. In this respect, there will be some cases in which the candidate set $Q_P$ cannot be determined at this stage, specifically, cases where the query points are unknown prior to the query. Such a scenario is described in Example 2 below.

In the case that K=1, that is, only the nearest neighbour was sought after, object point P would be the nearest neighbour for all points in $Q_P$, and no further processing would be required. However, in cases where K>1, further processing is required and one or more methods described herein can be implemented to improve the efficiency thereof.

As such, the next step 2.6 is to calculate the $C_{PMAX}$ for all of the query points q∈$Q_P$. To do this, the distance $R_P$ from the pre-defined location at object point P to the $K^{th}$ nearest neighbour data object is retrieved from the $D_n$ distances calculated during the pre-processing step. The maximum distance, $D_{PQmax}$, between the object point P and each of the query points q∈$Q_P$ is then calculated to thereby determine an area $C_{PMAX}$ having a radius $R_P+2D_{PQMAX}$ and centered at P.

The value of $D_{PQMAX}$ for a pre-defined location depends on the location of the query points in $Q_p$. In theory any random set of query locations may be selected as $Q_p$ and associated with a pre-defined location, but this will result in a large $D_{PQMAX}$ and subsequently large $C_{PMAX}$, which is no practical. In order to reduce $D_{PQMAX}$, the query points in $Q_p$ should be as close to the object point P as possible. A practical method to achieve this objective is to partition the entire space into multiple regions of polygons, for example, by constructing a Voronoi diagram/Thiessen polygon on the object points (i.e. the pre-defined locations), so that each object P is associated with a polygon region and any location inside the polygon has P as its nearest data object. If the query points q∈$Q_P$ are pre-defined at step 2.4, that is, they are known before the K-NN query, these polygon regions may be used to select query points q and compute $D_{PQMAX}$ accordingly.

If query points are un-known prior to the query, for example, they are generated in real-time, the distance from P to the furthest vertex on the boundary of a Thiessen polygon region is calculated as $D_{PQMAX}$. As such, any query falling into the polygon region will not have a distance to P that exceeds $D_{PQMAX}$. With this pre-determined $D_{PQMAX}$, it is possible to pre-query and buffer a candidate object set $S_c$ for P. In this case, once a dynamic query point (e.g. a vehicle) moves into a polygon region, either the buffered $S_c$ will be retrieved or a new spatial query will be performed using a pre-computed $R_P$ and $D_{PQMAX}$ to generate $S_c$. Subsequently, during the entire duration whilst the query point is inside the polygon region, its K-NN may be updated dynamically from its current location and $S_c$ without making further expensive queries on the spatial database.

At step 2.8, the circle $C_{PMAX}$ is used to perform a spatial query to retrieve $S_q$={$P_i$|$P_i$∈S and Distance($P_i$, P)≤$R_P$+2$D_{PQMAX}$}. That is to say, the circle $C_{PMAX}$ having a radius $R_P+2D_{PQMAX}$ and entered at P will be used to perform a K-NN query to thereby identify a set $S_q$ of object points $P_i$ enclosed therein, from which the K-NN object points for each query point q in $Q_P$ can be identified. For each query point q, the distances to all points in $S_q$ can then be computed to find its nearest K-NN object points. In this respect, the two-point K-NN result described with reference to FIGS. 1A and 1B may be used here if necessary to further speed up the process. That is to say, any object point P in $S_q$ having Distance(Q, P)>$R_P+2D_{PQ}$ may be disregarded without comparison.

Steps 2.4 to 2.8 can then be repeated for each object point P in the set S, which each P corresponding to a different set of query points $Q_P$. It should be noted that steps 2.4 to 2.8 will be preferably run in parallel so that the K-NN objects are found for each query set simultaneously, and is therefore especially suitable for distributed computation.

At step 2.10, the results of the K-NN spatial query may be output to the user. These results may be output to the user in any suitable way, for example, in a table format, or a graphical format, such as that shown in FIG. 3. FIG. 3 shows each of the query points 302 connected to its K-NN object points 304.

Example 1

Figure 2:
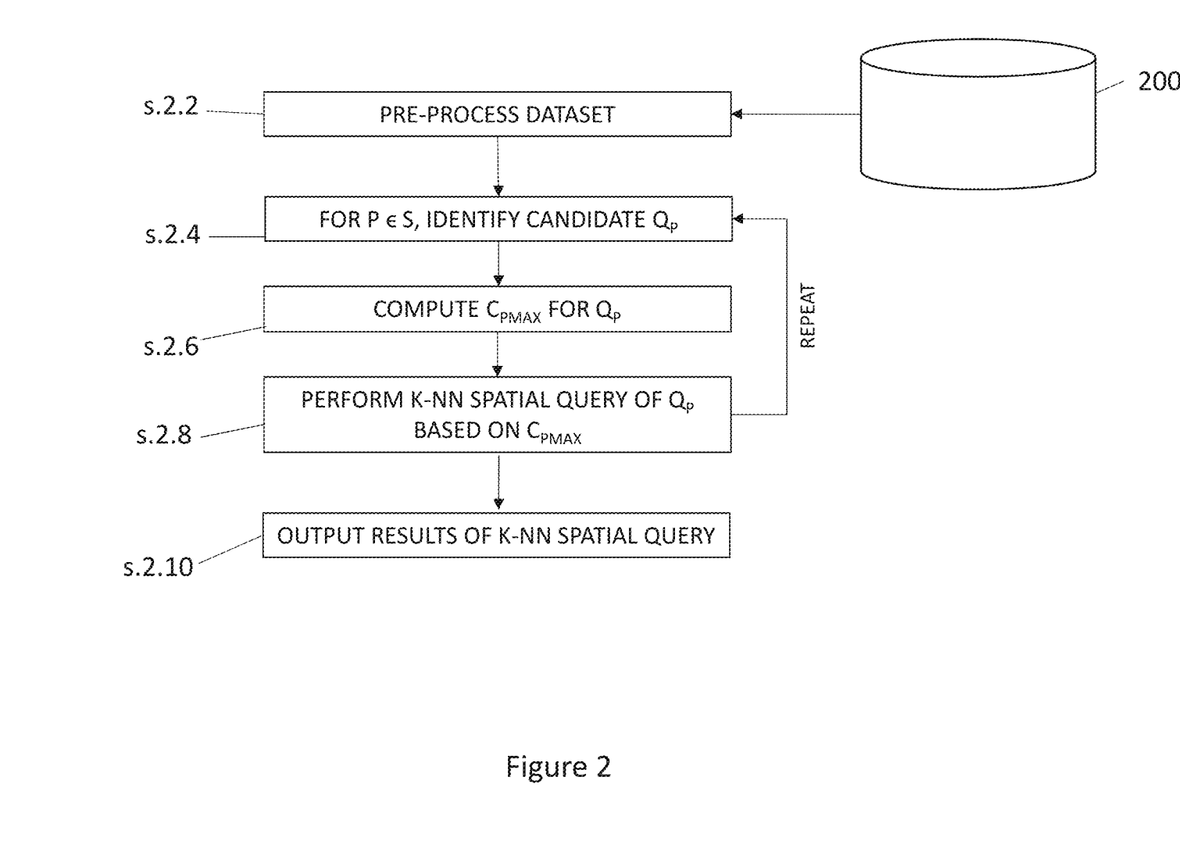
FIG. 2 is a flow diagram illustrating a method of performing K-NN spatial queries on a spatial database according to one or more illustrative aspects described herein.
Figure 3:
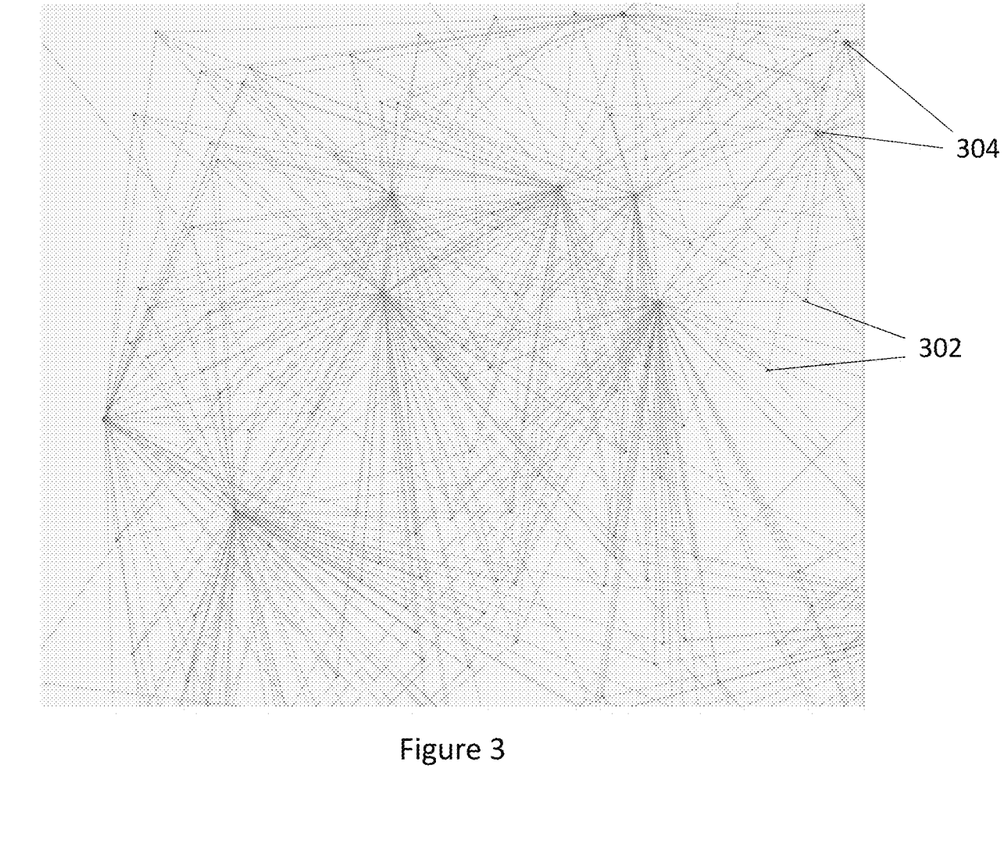
FIG. 3 is a diagram illustrating one or more illustrative aspects described herein in use.

With reference to FIG. 2, an example of the method of performing K-NN spatial queries in use will now be described. In this respect, the previous example of identifying the 6 nearest schools to every individual residential address in the UK will be used. As such, the object point set S comprises each school in the UK, whilst the query point set Q comprises each residential address in the UK. Consequently, the number of object points is relatively small compared to the number of query points.

Figure 4:
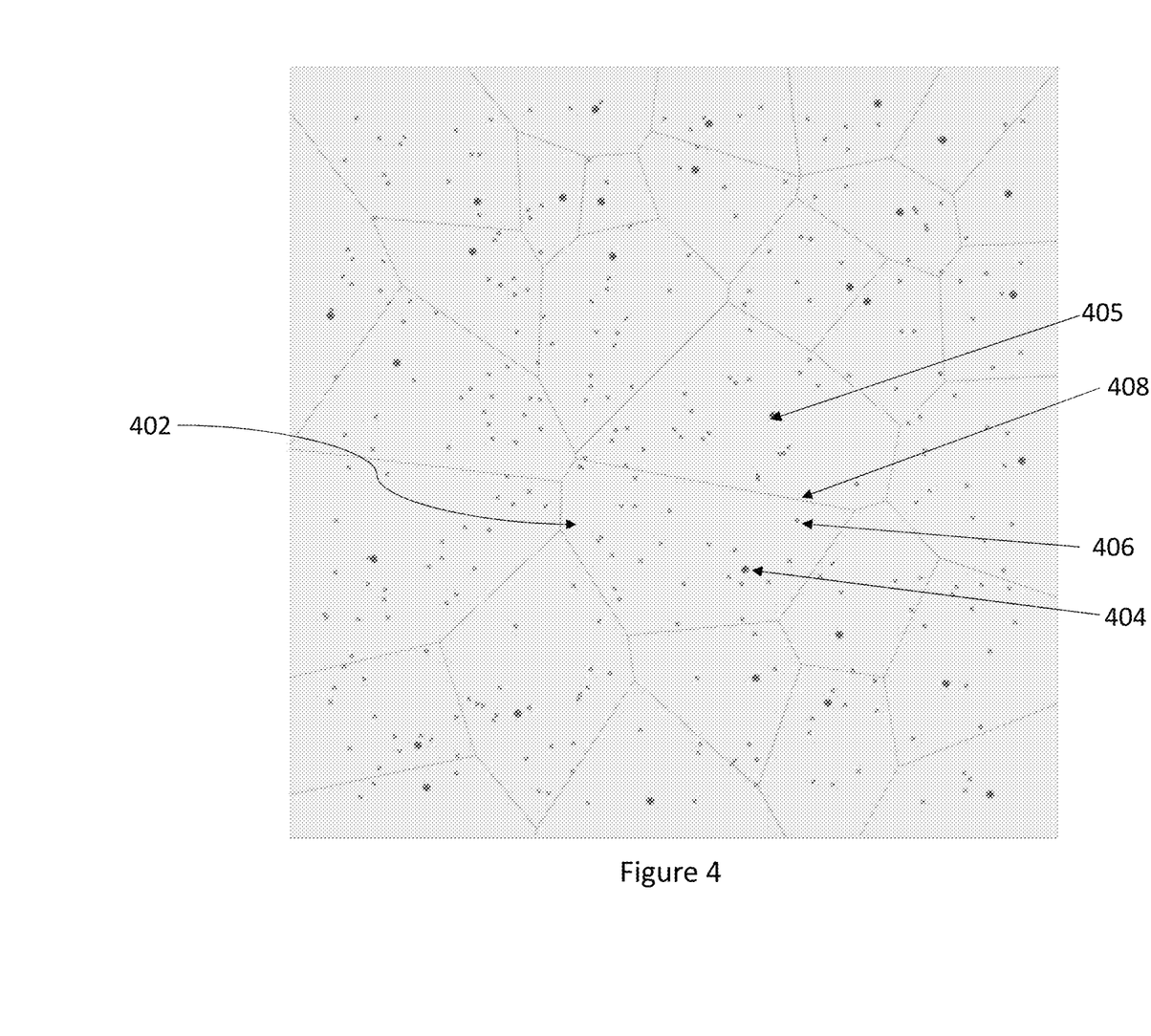
FIG. 4 is a diagram illustrating one or more illustrative aspects described herein in use.

As before, data is received from a spatial database 200 in order to pre-process the object point set S (step 2.2). As one example, a Delaunay triangulation DT(S) on the data points in S may be constructed in order to produce a Voronoi diagram of S, as illustrated by FIG. 4. Such processing methods are commonly known in the art.

As shown by FIG. 4, the Voronoi diagram comprises multiple Voronoi cells 402, also referred to as Thiessen polygons, where VDC(s) is a Voronoi cell 402 associated with point P∈S, point P being denoted by 404. Each polygon 404 comprises a set of boundary lines 408 that are located equidistantly from the nearest neighbouring points in S. That is to say, each boundary line 408 is located halfway between two points in S. As such, each polygon 402 corresponds to one school 404.

As before, for each pre-defined location, corresponding in this example to each object point P∈S, its K nearest neighbouring object points are then found. In the present example, for each school, the five nearest schools are found in addition to the school at the location. This may be facilitated by the Delaunay triangulation. For example, given K, for each point $P_0$ in the Delaunay Triangulation, the first step is to find m points $P_{1i}$ connected to $P_0$, with the maximum distance to $p_0$ being $L_{max}$. That is to say, a number of schools are identified, on average around 6, which are connected by a triangulation edge to the school being queried, the triangulation edges having a maximum length of $L_{max}$. Each of the points $P_{1i}$ are searched to find further connected points, and the number of points within a distance of $L_{max}$ from $P_0$ is counted. Any new points within a distance of $L_{max}$ from $P_0$ will then be searched recursively. If the number of points (including $P_0$) within the distance $L_{max}$ is more than or equal to K, then no further processing is required. If the number of points is less than K, the maximum distance of all current points to $P_0$ is set as new $L_{max}$, and used to find further connected points.

Figure 5:
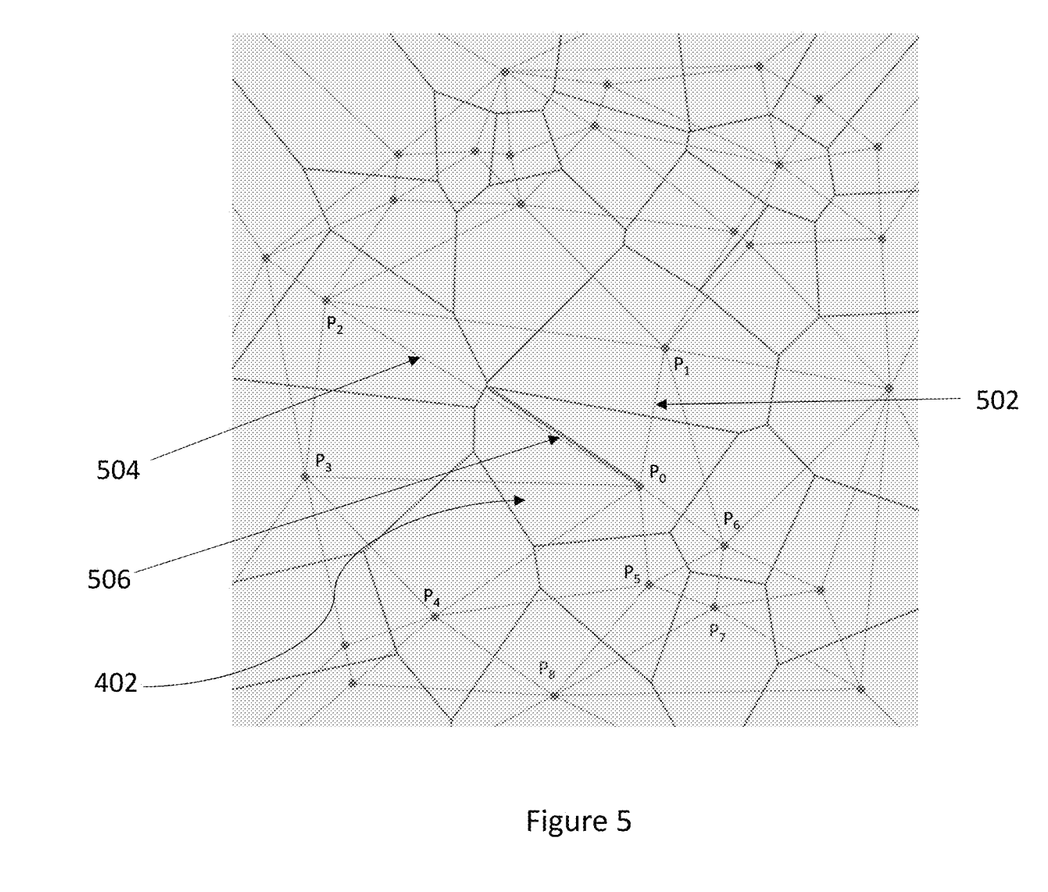
FIG. 5 is a diagram illustrating one or more illustrative aspects described herein in use.

An example of this is illustrated by FIG. 5. Given K=6, the 5 nearest neighbouring objects for $P_0$ are found. The objects connected to $P_0$ by a triangle edge 502 are collected into a set $S_c$={$P_1$, $P_2$, $P_3$, $P_4$, $P_5$, $P_6$} where $L_{max}$=Distance ($P_0$, $P_2$), denoted by edge 504. The same process is then repeated for each object in $S_c$ to find connected objects, which are then added into $S_c$. For example, in the case of $P_5$, two further objects $P_7$ and $P_8$ are identified and added into $S_c$. This is recursively repeated for any newly added object whose distance to $P_0$ is smaller than $L_{max}$ until all new objects found are further than $L_{max}$. If there are more than K objects in $S_c$ which are within $L_{max}$ to $P_0$, the K nearest objects are selected as the result and the search is terminated. However, if there are less than K objects $L_{max}$ is reset as the distance from $P_0$ to the furthest object in the current $S_c$, and the search is resumed.

Once the K nearest neighbours have been found for each P, the distances $D_n$ (n=2, K) to each of those schools is calculated and stored, which can then be used as the base radius $R_P$.

Once the Voronoi diagram has been constructed, the query location candidate set $Q_P$={q|q∈Q and VDC(s). Contains(q)=True} can then be identified for each object point P∈S (step 2.4), that is, the candidate set of residential addresses. As such, for each school P, the candidate set $Q_P$ corresponds to the residential addresses q (406) that are within the respective polygon 402, and hence each polygon 402 can be used to perform a spatial query on the spatial database to retrieve the set of query points 406 contained therein.

As discussed previously, if K=1, that is, only the nearest neighbouring school was sought after, P would be the nearest neighbour for all addresses in $Q_P$. That is to say, within each polygon 402, the object point 404 represents the nearest object point 404 to each of the query points 406 contained within the boundary lines 408 of the polygon 402. Therefore, in the present example, each polygon 402 comprises one school 404 and a plurality of residential addresses 406, the school 404 being the closest school to each of the addresses 406 contained within the boundary lines 408 of the polygon 402.

For cases where K>1, the next step 2.6 is to calculate the $C_{PMAX}$ for all of the addresses 406 in the query set $Q_P$ for the given P. The distance $D_n$ from the school 404 to the $5^{th}$ nearest neighbouring school is retrieved from the pre-processing step described above to provide $R_P$. The maximum distance between the school 404 and each of the residential addresses 406 in set $Q_P$ is then calculated as $D_{PQmax}$, as described above. This maximum distance is then used to perform a spatial query to retrieve a set of schools that comprise all of the K-NN schools for each of the addresses 406 in set $Q_P$. As described above, the area enclosed by circle $C_{PMAX}$ having a radius $R_P+2D_{PQMAX}$ and centered at the original school 404 will be used to perform a K-NN spatial query at step 2.8 to thereby identify a set of schools enclosed therein, from which the 6 nearest schools for each address in $Q_P$ can be identified. For each address 406, the distances to all points in the set of schools contained within $C_{PMAX}$ can then be computed to find its 6 nearest schools.

In the examples described herein, a circle $C_{PMAX}$ of radius $R_P+2D_{PQMAX}$ is used to retrieve data points. However, it will also be appreciated that an axis-aligned square that is centered at P with side length of $2*(R_P+2D_{PQMAX})$ may also be used, or likewise, a polygon constructed by buffering the Voronoi cell for P outwards by a buffer distance of $R_P+D_{PQMAX}$.

Steps 2.4 to 2.8 can again be repeated for each school P in the set S, with each school having a different set of residential addresses $Q_P$. For example, where the object set S has been pre-processed using Delaunay Triangulation and Voronoi diagram as discussed above, steps 2.4 to 2.8 may be repeated for each polygon 402, preferably in parallel.

The results of the K-NN spatial query may then be output to the user. For example, with reference to the graph shown in FIG. 3, each query point 302 corresponding to a residential address is connected to the six nearest neighbouring schools 304.

In cases where the object point set S and the query point set Q are both very large, for example, a spatial query to find the 6 nearest lamp posts for all households in the UK, the same method as described above may be used. However, due to the size of the object point set S, the pre-processing may further require a sampling process. For example, in the lamp post example, it would not be feasible to create Voronoi polygons for the whole source dataset S due to the number and frequency of lamp posts in the UK.

In such cases, assuming datasets are stored in an indexed spatial database, given a sampling rate r∈(0.0, 1.0), a number of points, n, can be randomly selected based on the size of data set S multiplied by the sampling rate r to form a sample set Si. The same method described above can then be performed based on the object points contained in sample set Si and the query points $Q_P$ corresponding to each object point in Si, as discussed with reference to steps 2.4 to 2.8.

If the processing at steps 2.8 produces a spatial query range $C_{PMAX}$ containing a set of object points $S_s$ that is too large to calculate the K-NN of the set of query points $Q_P$, another level of the same sampling process may be performed on $S_s$ and steps 2.4 to 2.8 repeated for the new subset of object points.

Example 2

In some cases, the query points are unknown prior to query. For example, in a spatial query to find the 5 nearest restaurants to an individual on the move, the query point (i.e. the individual) is continuously changing with time. In such cases, the candidate query set $Q_P$ is selected after the range of the spatial query, $C_{PMAX}$, is determined, as will now be described.

In this example, pre-processing of the object points can take place as described above (step 2.2).

Using the example of Voronoi cells, each polygon cell 402 will correspond to a restaurant 404, 405 in the spatial dataset, with the boundary lines 408 again corresponding to the half way point between two restaurants 404 and 405.

As before, for each pre-defined location, again corresponding to each point P∈S, its K nearest neighbouring points are then found, and the distances thereto calculated. In the present example, for each restaurant, the four nearest restaurants are found, and the distances $D_n$ (n=2, K) to each of those restaurants is calculated and stored.

As the query points are unknown, in order to calculate $C_{PMAX}$ (step 2.6), the distance $R_P$ to the 4th nearest restaurant is retrieved from the distances $D_n$ found previously, and the maximum distance $D_{PQMAX}$ is calculated as Max(Distance(P, $V_{vdc}$)), where $V_{vdc}$ are vertices of the Voronoi cell VDC(s). That is to say, $D_{PQMAX}$ corresponds to the furthest distance from a restaurant to one of the vertices of the polygon in which it sits. Consequently, if a query point falls into the polygon, its distance to the restaurant is at most $D_{PQMAX}$. This is further illustrated by FIG. 5, wherein the $D_{PQMAX}$, denoted by line 506, for an object $P_0$ is the distance from $P_0$ to the furthest vertex of the polygon 402 in which the object $P_0$ sits.

From this, the candidate set $Q_P$ can be selected based on the positions of the individual as it moves over a Voronoi polygon. For example, the candidate set $Q_P$ may correspond to the individual's trajectory across the Voronoi cell.

The spatial query may then be performed on the database using the area $C_{PMAX}$ having a radius $R_P+2D_{PQMAX}$ and centered at the restaurant for that polygon (step 2.8) to retrieve a set of restaurants. The distances to each of the restaurants identified within $C_{PMAX}$ can then be calculated for each point along the individual's trajectory to determine the 5 nearest restaurants, and any changes thereto, as the individual moves.

It should also be noted that the boundary effect may result in unnecessarily large $D_{PQMAX}$ for Voronoi cells at the boundary of a dataset. One way to reduce this effect is to clip boundary Voronoi cells with some appropriate extended dataset boundary. Such a method is well known in the art. For example, the clipping of boundary Voronoi polygons may be performed by calculating the concave hull of the dataset.

Figure 7:
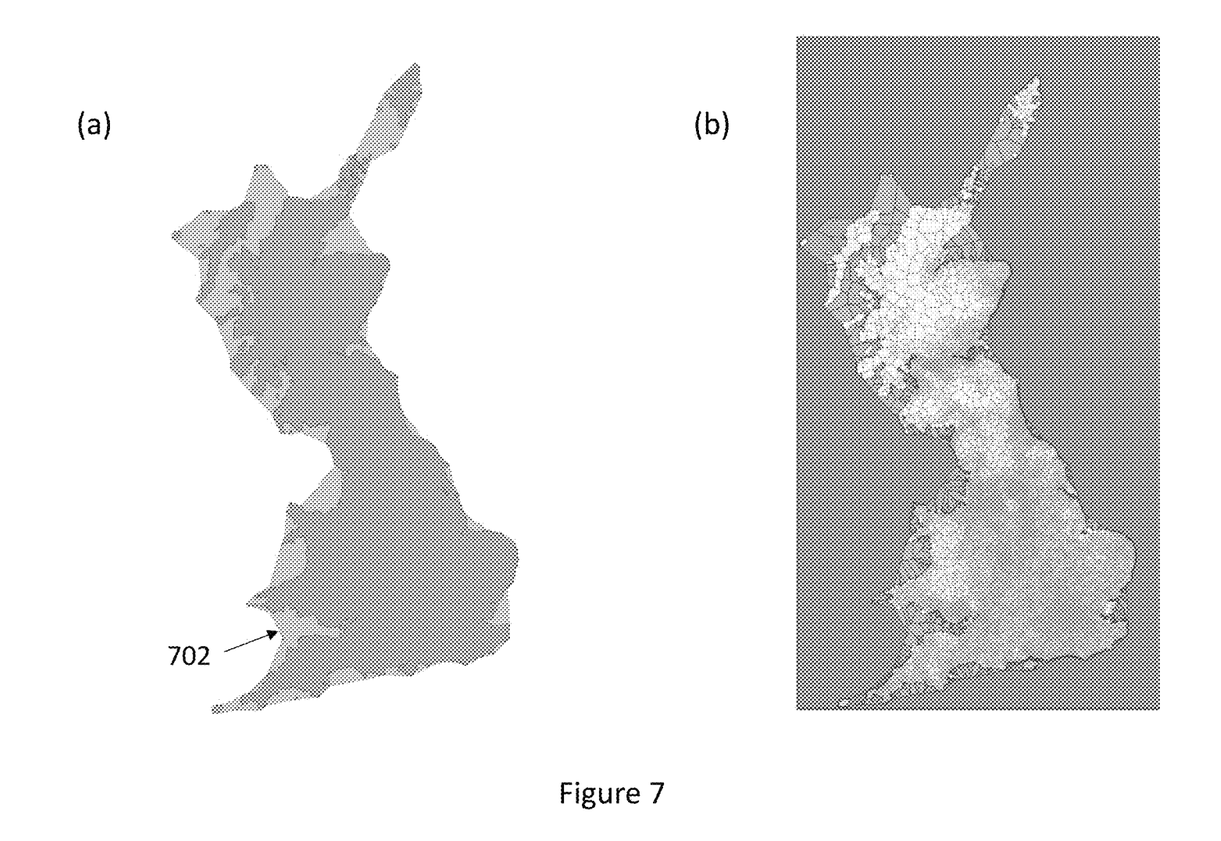
FIG. 7 is a diagram illustrating one or more illustrative aspects described herein in use.
Figure 8:
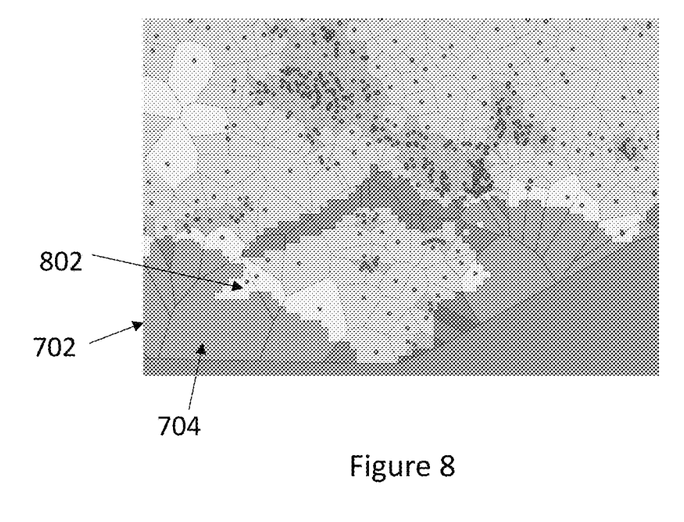
FIG. 8 is a diagram illustrating one or more illustrative aspects described herein in use.

As already mentioned, if the query points are not known prior to query, $D_{PQMAX}$ is computed using the maximum distance to the vertices of the Voronoi cell of a source point. On the boundary of the dataset, this distance may become unnecessarily very large, resulting in many irrelevant source points to be retrieved. A simple solution is to use a slightly enlarged convex hull of the source points to clip the Voronoi polygons. Alternatively, a concave hull will provide even better clipping results to further reduce the size of boundary Voronoi polygons, as shown in FIGS. 7 and 8. In this respect, FIG. 7 shows a concave hull 702 has been added to the boundaries of the United Kingdom. As further shown in FIG. 8, Voronoi polygons are constructed such that the concave hull 702 is also partitioned into polygons 704, which can be clipped to thereby improve the reliability of the boundary polygons 802.

Figure 6:
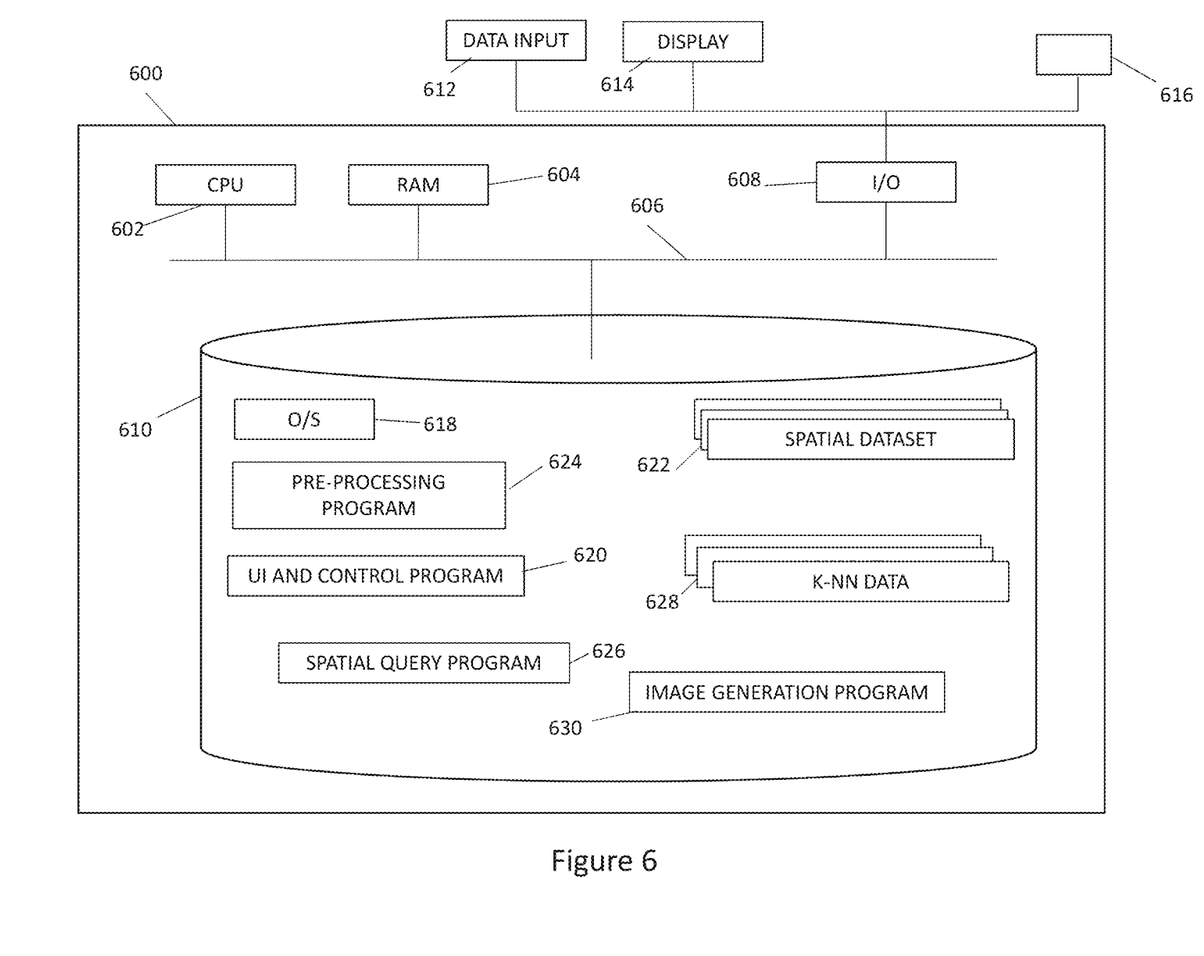
FIG. 6 is a block diagram illustrating a computer system on which one or more illustrative aspects described herein may be implemented.

FIG. 6 illustrates an example of a general computing device 600 that may form the platform for one or more illustrative aspects. For example, the computing device 600 may be a mobile phone, a tablet, a wearable computing device, IVI system or the like. The computing device 600 comprises a central processing unit (CPU) 602 and a working memory 604, connected by a common bus 606, and having an input-output (I/O) interface 608 arranged to receive control inputs from a user via a device connected to a data input port 612 such as a keyboard, mouse, touchscreen, push button, or other controller, and provide output information via a user interface which is displayed on a visual display device 614. The I/O interface 608 is also arranged to receive further inputs via various other devices and sensors, including but not limited to a satellite navigation system 616.

The computing device 600 is also provided with a computer readable storage medium 610 such as a hard disk drive (HDD), flash drive, solid state drive, or any other form of general-purpose data storage, upon which stored data, such as a spatial dataset 622, and various programs are arranged to control the computing device 600 to operate in accordance with the various aspects described herein. For example, stored on the computer readable storage medium 610 is an operating system program 618 that when run by the CPU 602 allows the system to operate. Also provided is a pre-processing program 624, a spatial query program 626, and an image generation program 630 which together implement the method of improving spatial queries as described herein when run by the CPU 602, as will be described in more detail below. In order to interface with and control the pre-processing program 624, spatial query program 626, and image generation program 630, a user interface and control program 620 is also provided, that controls the computing device 600 to provide a visual output to the display 614, and to receive user inputs via any input means connected to the data input port 612, or any other device connected to the I/O interface 608 in order to control the pre-processing program 624, spatial query program 626, and image generation program 630.

Upon receiving instructions to perform a spatial query, for example, via the data input port 612, the user interface and control program 620 will extract the relevant data from the spatial dataset 622 for input to the pre-processing program 624, which will perform the necessary pre-processing of the source data described with reference to step 2.2 above. The pre-processed source data, and the query point data, will then be input to the spatial query program 626. In cases where the query point data is unknown, such as cases where the query point data relates to a user on the move, data may be received from a satellite navigation system 616 via a wired or wireless connection and input to the spatial query program. The spatial query program 616 will then perform the method of spatial queries described above with reference to steps 2.4 to 2.8, to thereby output K-NN data 628. This may then be output to the user via the display 614. In this respect, the image generation program 630 may be used to generate a suitable visual representation of the K-NN data 628. The K-NN data 628 may also be output to the user as a set of raw data, for example, in table format.

Experiment Results

Experimental spatial queries were performed using the method described above, using the 6-nearest school problem discussed in Example 1 above, the results of which are shown in the below table.

In the UK, the number of residential addresses is 28,597,000 and the number of schools is 23,855. It took a total of about 25.9 hours to compute the 6 nearest schools for all addresses, in addition to around a minute to pre-process the school data, that is, to compute the distances to 5 nearest other schools and generate the Voronoi diagram for all schools. This averages as about 3.22 seconds per 1000 addresses.

In comparison, the performance of individual queries was tested making use of pre-processing described with reference to FIG. 1, and using open source software program PostGIS' own K-NN, which utilise a spatial index such as a R-Tree to perform spatial queries one by one, (using 'order by' and 'limit') on 100 random selected Voronoi diagram cells, with an output of 19.43 seconds per 1000 addresses. For database management system Postgres built-in query (calling via JDBC), wherein all of the K-NN results are output in batch, an output of 28.37 seconds per 1000 addresses was achieved.

| Process Method | Dataset | Time per 1000 points |
| --- | --- | --- |
| 2DMAX | Full (28.6 million addresses) | 3.22 s |
| Individual Query | 100 VDC (147358 addresses) | 19.43 s |
| PostGIS SQL | 100 VDC (147358 addresses) | 28.37 s |

The above results demonstrate that the presently described methods and system provide improved techniques for performing spatial queries. In some particular scenarios, for example, where the number of queries far exceeds the number of data points, the improved techniques provide a significant improvement in the speed and efficiency of conventional KNN queries. This is not restricted to 2D spatial data but may be applied to higher dimensional and non-spatial data as well.

Various modifications, whether by way of addition, deletion and/or substitution, may be made to all of the above described embodiments to provide further embodiments, any and/or all of which are intended to be encompassed by the appended claims.

The invention claimed is:

1. A computer implemented method of performing K-nearest neighbor (K-NN) spatial queries on a spatial database, wherein K is an integer value, the method comprising:
   receiving instructions to perform a K-NN query on a spatial database stored in one or more computer readable media to find a set of K-NN data objects for a plurality of query locations;
   processing, by one or more processors of a data processing device, a plurality of pre-defined locations within the spatial database to calculate a plurality of object distances, wherein an object distance corresponds to a maximum distance between a pre-defined location and a set of K-NN data objects of said pre-defined location;

identifying, by the one or more processors, a first pre-defined location and determining a candidate set of query locations therefrom;

computing, by the one or more processors, a range of the K-NN query for the candidate set of query locations in dependence on the object distance calculated for the first pre-defined location, and a maximum distance between the first pre-defined location and one of the query locations within the candidate set; and determining, by the one or more processors, a set of K-NN data objects for each of the candidate set of query locations in dependence on the computed range.

2. A method according to claim 1, wherein computing the range of the K-NN query comprises calculating an area of the spatial database, the area containing at least one data object.

3. A method according to claim 1, wherein computing the range of the K-NN query comprises calculating an area of the spatial database enclosed by a circle having a maximum radius calculated using the object distance calculated for the first pre-defined location and a maximum distance between the first pre-defined location and one of the query locations within the candidate set.

4. A method according to claim 3, wherein the maximum radius, $R_{MAX}$, is calculated by:

$$R_{MAX} = R_P + 2D_{PQMAX}$$

wherein:

$R_P$ is the object distance calculated for the first pre-defined location; and $D_{PQMAX}$ is the maximum distance between the first pre-defined location and one of the query locations within the candidate set.

5. A method according to claim 2, wherein the determining a set of K-NN data objects comprises:

identifying a set of data objects contained within the calculated area; and computing the K-NN data objects for each query location within the candidate set from the set of data objects within the calculated area.

6. A method according to claim 5, wherein the computing the K-NN data objects for each query location comprises calculating a distance from each query location to each data object within the calculated area.

7. A method according to claim 1, wherein the processing a plurality of pre-defined locations within the spatial database further comprises generating a polygon partitioning of the spatial database, wherein a plurality of polygons are generated such that each polygon represents an area comprising a single pre-defined location.

8. A method according to claim 7, wherein the determining a candidate set of query locations comprises identifying query locations contained within a polygon corresponding to the first pre-defined location.

9. A method according to claim 1, wherein the determining a candidate set of query locations comprises identifying one or more dynamic query locations and tracking a position of the one or more dynamic query locations in real time.

10. A method according to claim 9, wherein the maximum distance between the first pre-defined location and one of the dynamic query locations is a predetermined distance based on the processing of the plurality of pre-defined locations.

11. A method according to claim 10, wherein the processing a plurality of pre-defined locations further comprises generating a polygon partitioning of the spatial database, wherein a plurality of polygons are generated such that each polygon represents an area comprising a single pre-defined location, and wherein the predetermined distance is a maximum distance between the pre-defined location and a vertex of the respective polygon.

12. A method according to claim 9, wherein determining the K-NN data objects of each dynamic query location comprises dynamically updating the K-NN data objects of each dynamic query location based on a current position of the dynamic query location within the spatial database at a given time.

13. A method according to claim 9, wherein the spatial database comprises geospatial data representative of a geographic area, and wherein the one or more dynamic query locations comprise one or more geographic coordinates of an object moving from a first geographic location to a second geographic location.

14. A method according to claim 13, wherein the K-NN data objects are representative of features of the geographic area.

15. A method according to claim 1, further comprising generating a visual output of the set of K-NN data objects of at least one of the candidate set of query locations for display.

16. A method according to claim 1, wherein the spatial database comprises geospatial data representative of a geographic area.

17. A system comprising:

a processor; and a computer readable medium storing one or more instruction(s) arranged such that, when executed by the processor, the system is configured to perform one or more K-nearest neighbour (K-NN) spatial queries on a spatial database, wherein K is an integer value, by:

receiving instructions to perform a K-NN query on the spatial database to find a set of K-NN data objects for a plurality of query locations;

processing a plurality of pre-defined locations within the spatial database to calculate a plurality of object distances, wherein an object distance corresponds to a maximum distance between a pre-defined location and a set of K-NN data objects of said pre-defined location;

identifying a first pre-defined location and determining a candidate set of query locations therefrom;

computing a range of the K-NN query for the candidate set of query locations in dependence on the object distance calculated for the first pre-defined location, and a maximum distance between the first pre-defined location and one of the query locations within the candidate set; and determining a set of K-NN data objects for each of the candidate set of query locations in dependence on the computed range.

18. A system according to claim 17, wherein the instructions further configure the system to generate a visual output of the set of K-NN data objects of at least one of the candidate set of query locations for display.

19. A system according to claim 17, wherein the spatial database comprises geospatial data representative of a geographic area.

20. A system according to claim 17, wherein the determining a candidate set of query locations comprises identifying one or more dynamic query locations and tracking a position of the one or more dynamic query locations in real time.

* * * * *